(12) United States Patent
Burock

(10) Patent No.: US 11,460,065 B2
(45) Date of Patent: Oct. 4, 2022

(54) METHOD AND DEVICE FOR FILLING SEAL CAPS

(71) Applicant: CHEMETALL GMBH, Frankfurt (DE)

(72) Inventor: Heinz Burock, Frankfurt am Main (DE)

(73) Assignee: CHEMETALL GMBH, Frankfurt (DE)

( * ) Notice: Subject to any disclaimer, the term of this patent is extended or adjusted under 35 U.S.C. 154(b) by 0 days.

(21) Appl. No.: 16/320,705

(22) PCT Filed: Jul. 25, 2017

(86) PCT No.: PCT/EP2017/068793
§ 371 (c)(1),
(2) Date: Jan. 25, 2019

(87) PCT Pub. No.: WO2018/019848
PCT Pub. Date: Feb. 1, 2018

(65) Prior Publication Data
US 2019/0162223 A1    May 30, 2019

(30) Foreign Application Priority Data

Jul. 26, 2016 (DE) .......................... 102016213669.0
Aug. 2, 2016 (DE) .......................... 102016214201.1

(51) Int. Cl.
*F16B 33/00* (2006.01)
*F16B 37/14* (2006.01)
(Continued)

(52) U.S. Cl.
CPC .......... *F16B 33/004* (2013.01); *B05C 5/0216* (2013.01); *B05C 13/025* (2013.01);
(Continued)

(58) Field of Classification Search
CPC ........ F16B 33/004; F16B 37/14; F16B 33/00; B05C 5/0216; B05C 13/025;
(Continued)

(56) References Cited

U.S. PATENT DOCUMENTS 3,470,787 A * 10/1969 Mackie ................. F16B 33/004
411/377
4,382,049 A * 5/1983 Hofmeister ............. B29C 70/74
174/2
(Continued)

FOREIGN PATENT DOCUMENTS

EP    2586537 A1    5/2013
EP    2604893 A1    6/2013
(Continued)

OTHER PUBLICATIONS

"Liquid Control Limited," LiquidControl1971, Nov. 25, 2010, [Retrieved on Jan. 28, 2020. Retrieved from the Internet URL: https://www.youtube.com/watch?v=AAXTGOONvXI] (Year: 2010).*
(Continued)

*Primary Examiner* — Reinaldo Sanchez-Medina
*Assistant Examiner* — Stephanie A Shrieves
(74) *Attorney, Agent, or Firm* — Armstrong Teasdale LLP

(57) ABSTRACT

Described herein is a method for filling seal caps and a corresponding automated device for filling seal caps.
The method for filling seal caps includes carrying out the filling of the seal caps using an automated process, wherein positioning a filling unit and/or positioning the seal caps by means of movement in an XYZ coordinate system as well as filling the seal caps is automated, and wherein the seal caps are positioned on a support plate.

9 Claims, 3 Drawing Sheets

(51) Int. Cl.
- *B05C 5/02* (2006.01)
- *B05C 13/02* (2006.01)
- *B29C 31/04* (2006.01)
- *B29C 31/06* (2006.01)
- *B29C 39/10* (2006.01)
- B29L 31/26 (2006.01)
- B64D 45/02 (2006.01)

(52) U.S. Cl.
CPC .......... *B29C 31/044* (2013.01); *B29C 31/047* (2013.01); *B29C 31/06* (2013.01); *B29C 39/10* (2013.01); *F16B 37/14* (2013.01); B29L 2031/26 (2013.01); B64D 45/02 (2013.01)

(58) Field of Classification Search
CPC ..... B29C 31/044; B29C 31/047; B29C 31/06; B29C 39/10; B29L 2031/26; B64D 45/02; B65B 43/56; B65B 3/26; B65B 3/30; A61J 1/2089; A61J 1/201; A61J 1/2037; A61J 1/2048; A61J 1/10; A61J 1/2096; A61J 3/002; A61J 2200/74; F04B 7/0076; F04B 11/0041; F04B 43/021; A16M 2205/128; Y10S 128/12
USPC ...... 141/1; 411/377, 337, 372–373; 361/218
See application file for complete search history.

(56) References Cited

U.S. PATENT DOCUMENTS

| | | | | |
|---|---|---|---|---|
| 4,519,974 A * | 5/1985 | Bravenec | ................. | F16J 15/14 425/436 R |
| 4,526,215 A * | 7/1985 | Harrison | ............. | B01F 13/1055 141/83 |
| 4,923,348 A * | 5/1990 | Carlozzo | ............... | F16B 33/004 411/377 |
| 4,971,745 A * | 11/1990 | Ferenc | .............. | B29C 45/14336 264/263 |
| 5,454,406 A * | 10/1995 | Rejret | ................. | B67D 1/1213 137/624.12 |
| 6,001,181 A * | 12/1999 | Bullen | .................. | B05C 5/0216 118/323 |
| 6,127,457 A * | 10/2000 | Darling | .............. | A41D 13/0125 523/218 |
| 6,365,226 B1 * | 4/2002 | Wu | ........................ | B05C 5/0216 123/337 |
| 6,863,092 B2 * | 3/2005 | Seiver | ...................... | B67C 3/30 141/129 |
| 7,134,666 B2 * | 11/2006 | Beyssac | ................ | B65D 75/327 277/316 |
| 7,438,974 B2 * | 10/2008 | Obuhowich | ......... | C09K 3/1012 277/316 |
| 8,616,868 B2 * | 12/2013 | Hutter, III | ............... | B29C 39/26 425/117 |
| 8,717,736 B2 * | 5/2014 | Asahara | ................ | F16B 39/225 361/218 |
| 9,228,604 B2 * | 1/2016 | Dobbin | ..................... | B64C 1/12 |
| 9,447,808 B2 * | 9/2016 | Obuhowich | ............ | F16B 37/14 |
| 10,051,767 B2 * | 8/2018 | Yoon | .................... | B32B 37/153 |
| 2002/0159919 A1 * | 10/2002 | Churchill | .......... | G01N 35/1002 422/400 |
| 2004/0011284 A1 * | 1/2004 | Schucker | ............... | B25J 19/023 118/688 |
| 2012/0219380 A1 * | 8/2012 | Hutter, III | ............. | B64D 45/02 411/377 |
| 2014/0079871 A1 * | 3/2014 | Lu | ........................ | H05K 3/3485 427/8 |
| 2014/0091175 A1 * | 4/2014 | Yoon | ....................... | F16B 37/14 244/1 A |
| 2014/0234050 A1 * | 8/2014 | Asahara | ................ | B64D 45/02 411/371.1 |
| 2014/0235083 A1 * | 8/2014 | Day | ........................ | F16J 15/14 439/276 |
| 2014/0341675 A1 * | 11/2014 | Dobbin | ................... | F16B 37/14 411/82.1 |
| 2015/0034800 A1 * | 2/2015 | Martinez-Marin | ..... | B29C 33/00 249/184 |
| 2015/0063945 A1 * | 3/2015 | Obuhowich | .......... | F16B 33/004 411/372.6 |
| 2015/0086706 A1 * | 3/2015 | Guzowski | ........... | B05B 12/1463 427/8 |
| 2015/0108685 A1 * | 4/2015 | Pajel | ....................... | B05C 17/00 425/117 |
| 2015/0321418 A1 * | 11/2015 | Sterman | ................ | B29C 64/118 264/40.7 |
| 2016/0114348 A1 * | 4/2016 | Cheung | ................. | B05C 17/012 222/333 |
| 2016/0136859 A1 * | 5/2016 | Song | ................. | B05C 17/00516 411/82.1 |
| 2016/0279863 A1 * | 9/2016 | Trend | ........................ | B64F 5/00 |
| 2017/0298979 A1 * | 10/2017 | Aston | ...................... | F16B 37/14 |

FOREIGN PATENT DOCUMENTS

| | | | | |
|---|---|---|---|---|
| KR | 20140036285 A | * | 3/2014 | |
| WO | 2012118855 A2 | | 9/2012 | |
| WO | 2014201188 A1 | | 12/2014 | |
| WO | WO-2014201188 A1 | * | 12/2014 | ............. B64D 45/02 |
| WO | WO-2016106364 A1 | * | 6/2016 | ......... B29C 35/0888 |
| WO | 2018184878 A1 | | 10/2018 | |

OTHER PUBLICATIONS

KR-20140036285-A English Translation of Specification (Year: 2020).*
"Dielectric Strength," Omnexus by SpecialChem, Dec. 15, 2015, [Retrieved on Jan. 29, 2020. Retrieved form the Internet URL: https://web.archive.org/web/20151222123505/https://omnexus.specialchem.com/polymer-properties/properties/dielectric-strength] (Year: 2015).*
International Search Report issued in PCT/EP2017/068793 dated Oct. 27, 2017, 2 pages.
"Aerospace Dispense Systems For Automated Cartridge Dispensing, Advanced Structural Bonding and More" Nordson Sealant Equipment, May 15, 2015, pp. 1-5.
"Liquid Control Limited—WR3000PT XYZ Robot", Liquid Control 1971, Youtube, Nov. 25, 2010 (URL:https://www.youtube.com/watch?v=AAXTGOONvXI).
Anonymous, "Dispensing Automation", Fisnar Robotics, Jun. 17, 2015, pp. 1-28.
Fisnar Inc., "Manual to automated dispensing comparison", Youtube, Nov. 5, 2009 (URL:https://www.youtube.com/watch?v=SdcaMUc2rY&list=PLIWI0C87f7ec10SxxwwswiiO7JCeRH WcP).

* cited by examiner

METHOD AND DEVICE FOR FILLING SEAL CAPS

CROSS-REFERENCE TO RELATED APPLICATIONS

This application is the national stage entry of PCT/EP2017/068793, filed on Jul. 25, 2017, which claims the benefit of priority to German Patent Application No. 10 2016 213 669.0, filed Jul. 26, 2016 and to German Patent Application No. 10 2016 214 201.1, filed Aug. 2, 2016, each of which is incorporated by reference in its entirety herein.

BACKGROUND

Within the aircraft industry, rivets or rivet heads are typically coated with a sealing agent (sealant) or, in the cured state, with a seal cap, in order to seal them off or to provide protection from corrosion. The sealing agent is generally applied manually, carried out for example with cartridge guns that are guided by hand.

As an alternative to this, it is also possible to use seal caps, which are produced from sealing agent but have already undergone curing, these caps being supplied in a corresponding contour to the rivet or the rivet head. These cured seal caps may then be used further in a variety of ways:

In one instance, the cured seal caps may be filled with fresh sealant and deep-frozen in order to prevent the sealant reacting. Shortly before use, the caps are thawed and are then ready for service. This method, however, has the disadvantage that the seal caps filled with frozen sealant have only a limited storage life, must first be conditioned prior to service, and, moreover, carry a risk of forming condensation. Another disadvantage lies in the logistical chain, which requires rapid transport and also the provision of deep freezers.

Alternatively, the seal caps may also be filled with sealant manually, using a cartridge gun, directly before their application, after which they are processed. This method, however, is unable to ensure uniform filling of the seal caps, since in this operational step they cannot be weighed. The amount injected may therefore also be over or underdosed. This procedure, moreover, is very time-consuming and inconvenient, requiring the handling simultaneously of cartridge gun and sealant cap, and requiring the cap to be mounted promptly.

BRIEF SUMMARY OF THE INVENTION

It was an object of the present invention, therefore, to provide a method for filling seal caps that does not have the disadvantages identified above. The filling of the seal caps with sealant is to take place in particular in a time-saving manner but with high quality, and at the same time is to result in a reduction in cost.

The present invention provides a method for filling seal caps, and also a corresponding automated device.

The underlying object of the present invention is achieved by means of the method according to claim 1. Preferred embodiments are specified in the dependent claims.

The method of the invention can be used for filling seal caps which have already undergone curing. In that case the filled sealant may be frozen, as described above, to be used after a certain storage time, or else, as likewise already set out above, can be filled shortly before the seal cap is mounted. With preference the seal caps are not frozen, but are instead filled shortly before being mounted, thereby allowing the costs to be reduced, since there is no need for deep freezers to be provided and also no need to maintain a cooling chain.

In the method of the invention for filling seal caps, the filling of the seal caps is carried out automatedly, wherein the positioning of the filling unit and/or the positioning of the cured seal caps by means of movement in XYZ direction as well as the filling of the seal caps take place automatedly and wherein the cured seal caps are positioned on a support plate. Relative to the known, manual filling of the seal caps, this results in a time saving of up to 100%.

The automation of the filling procedure is for example under software control, with either the seal caps located on the support plate and/or the filling unit of the device, from which the sealant is filled into the seal cap, being moved in X, Y or Z direction. Preferably this is done using a robot or a similar device with XYZ travel, allowing either the support plate together with the seal caps, and/or the filling unit, to be moved automatedly in order for the sealant to be filled in on correct positioning.

In a further-preferred embodiment, the method of the invention may also comprise the automated mounting of the seal cap after it has been filled.

The object on which the present invention is based is further achieved by the device according to claim 10.

In accordance with the invention, a device or robot of this kind comprises

- a filling unit with which the sealant is filled into the seal cap;
- a support plate on which the cured seal caps are located;
- a displacement travel unit with which either the filling unit and/or the support plate can be moved, preferably by means of corresponding motorization; and
- a control unit with which the movement of the filling unit and/or the support plate and the filling are regulated, with each of the displacement travel unit and the filling unit being controlled by the control unit.

BRIEF DESCRIPTION OF DRAWINGS

An example of a corresponding robot is illustrated in FIGS. 1 to 4.

DETAILED DESCRIPTION

Figure 1:
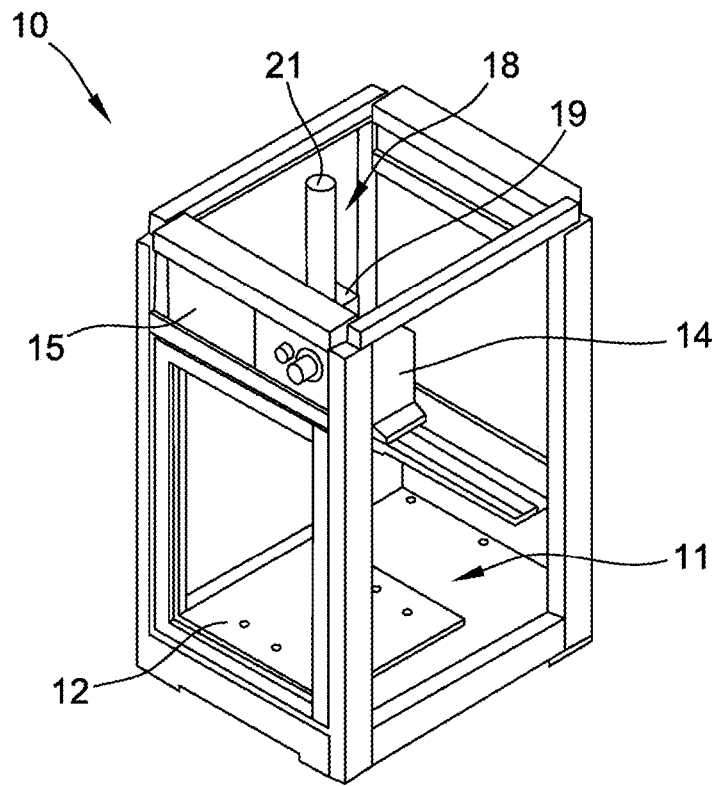
FIG. 1: View of the robot from diagonally above. Visible here is the base of the robot, which serves for the fastening of the support plate.
Figure 2:
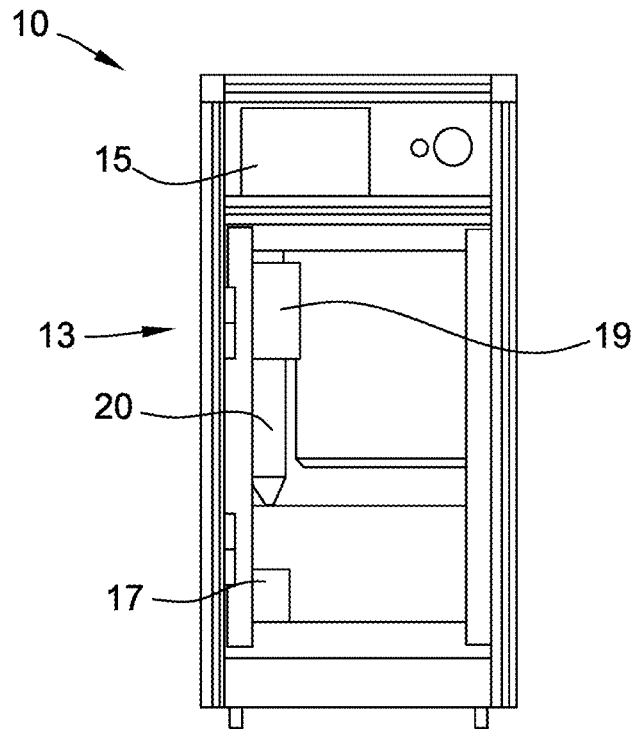
FIG. 2: Front view of the robot.
Figure 3:
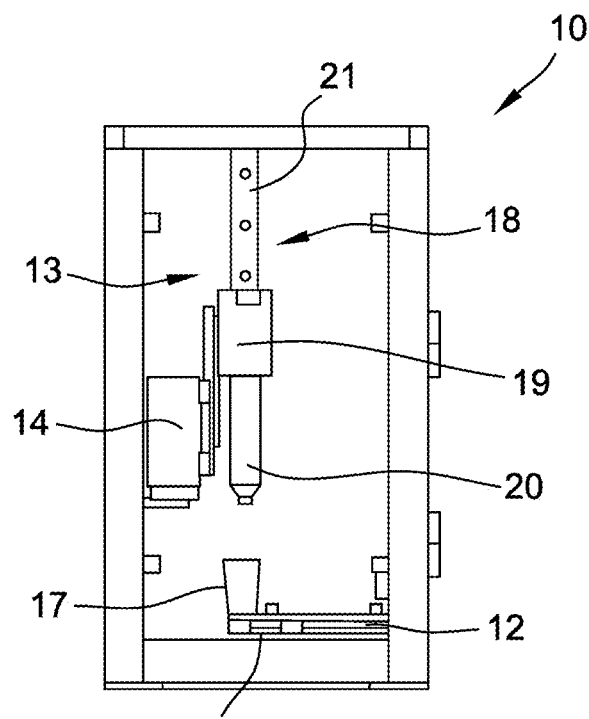
FIG. 3: Side view of the robot. The filling unit here comprises a cartridge with mixed sealant, which is fastened on a metering head.

Referring to FIGS. 1-4, in one aspect of the invention, a device or robot 10 has a base 11, a support plate 12, a filling unit 13, a displacement travel unit 14 and a control unit 15. The filling unit 13 fills sealant 16 into a seal cap 17. The support plate 12 is fastened to base 11 and a seal cap 17 is positioned on the support plate 12. The filling unit 13 includes an extrusion unit 18, which has a metering head 19, such as a compressed-air drive or servo drive. The extrusion unit 18 may be a cartridge extrusion unit as shown in FIGS. 1-3. A cartridge 20 with mixed sealant 16 may be inserted into the extrusion unit 18 and fastened to the metering head 19. In one aspect, the cartridge extrusion unit 18 includes a piston 21.

Figure 4:
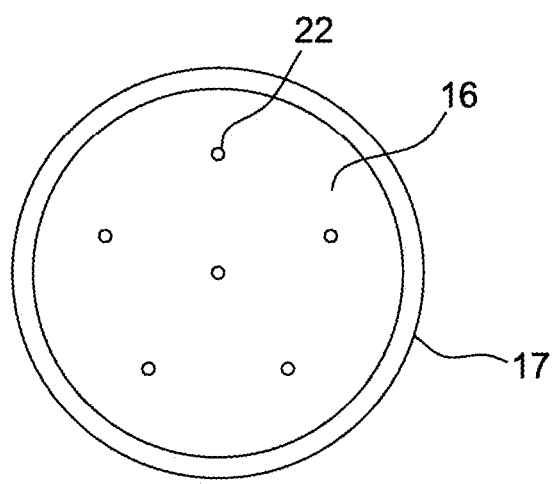
FIG. 4: Schematic diagram of the top section view of a filled seal cap in accordance with an exemplary embodiment.

A filled seal cap 17 is shown in FIG. 4. The sealant 16 may include a filler, such as hollow filling bodies filled with gas and/or air. In one aspect, the hollow filling bodies filled with gas and/or air are microballoons 22.

The filling unit preferably comprises an extrusion unit with which the sealant is pressed from a corresponding container into the seal cap. The device of the invention to be used comprises more particularly a cartridge extrusion unit with compressed-air drive or servo drive as filling unit, and cartridges filled with ready-made sealant are inserted into the extrusion unit, from which cartridges the sealant is then extruded on filling. It is, however, also possible for the extrusion unit to comprise a mixing vessel in which, from two different lines, the two components are filled in and subsequently mixed, so that the sealant is produced directly prior to filling.

The cartridge extrusion unit preferably has a servo drive. In this case the cartridge is filled with the sealant and is pressed out by means of a piston which is controlled via the servo drive. With particular preference the servo drive is suitable for two different cartridge sizes which are commonplace within the aircraft industry. As a result, there is no need for an air-assisted pressing unit, and so compressible sealants (sealants which are not newtonian fluids and which are compressed during extrusion) can be used.

In one preferred embodiment of the present invention, the automated device is portable. In this case, then, the device has dimensions and a configuration such as to allow a rapid set-up and take-down of the device. A portable device allows set-up directly at the premises of the user, who is able consequently to mount the seal caps on the respective rivet or rivet head without a time delay.

The significant increase in operating speed as a result of filling by means of an automated device, such as a suitable robot system, for example, also allows an increase in the cycle rate in aircraft construction if the activities performed manually during the filling and mounting of the seal caps are reduced.

Where a suitable robot system is used, the average time for the filling of a seal cap with sealant is, for example, only 2.5 seconds. In comparison to this, in the case of manual filing, the procedure is time-consuming.

Figure 6:
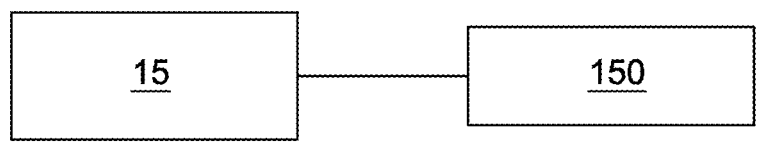
FIG. 6 is a block diagram of the control unit in accordance with an exemplary embodiment.

The automated device, preferably the robot, is able to inject the sealant, in one preferred embodiment, into the seal caps in the arrangement dictated by the support plate. The seal caps in this case are fastened in a freely selectable arrangement on the support plate, this arrangement of the seal caps on the support plate either having been programmed into the software of the control unit beforehand, or the control unit comprising a—for example—optical recognition unit which is capable, during or before the filling of the seal caps, of determining the position of the other seal caps and directing them correspondingly with the filling unit. FIG. 6 provides a block diagram of the control unit in accordance with an exemplary embodiment. With reference to FIG. 6, the control unit 15 includes an optical recognition unit 150.

Figure 5:
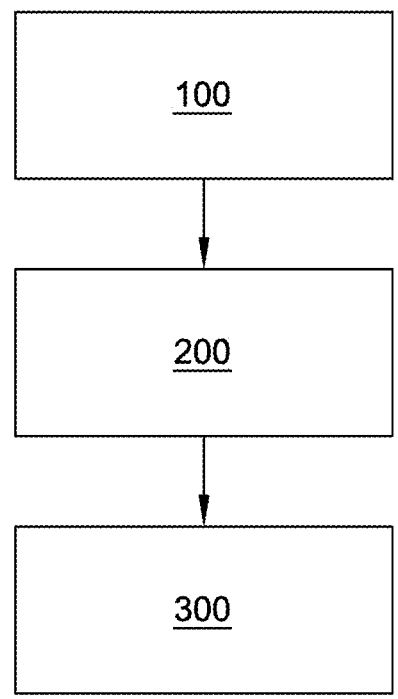
FIG. 5 is an illustration of a method for filling seal caps in accordance with an exemplary embodiment.

The number of seal caps on the support place can be varied within a wide range and is dependent only on the size of the seal cap in relation to the size of the support plate. The seal caps can also be positioned on the support plate in such a way that the positioning pattern on the support plate is similar to or indeed corresponds to the positioning pattern of the rivets or rivet heads on the actual component. This makes it easier to recognize the correct position for the seal cap to be applied. FIG. 5 provides an illustration of a method for filling seal caps in accordance with an exemplary embodiment. With reference to FIG. 5, seal caps are filled with sealant using an automated process 100, a filling unit and/or seal caps are positioned by means of automated movement in an XYZ coordinate system 200 and the seal caps are positioned on a support plate in a positioning pattern corresponding to a positioning pattern of connecting elements to be sealed 300.

The robot is able to inject the sealant, in one preferred embodiment, into the seal caps in the contour dictated by the support plate.

The amount of sealant to be injected is dependent on user requirements and may be specified for each seal cap in accordance with its geometry and with the geometry of the rivet or rivet head. In one preferred embodiment, prior to the filling, the standardized amount for the particular size of seal cap is stored in a suitable program of the control unit. On the basis of these stored data, the automated device, preferably the robot, is then able to fill the respectively correct amount into the seal cap.

As a result, over and/or underdosing of the seal cap with too little or too much sealant is avoided. At the same time, the formation of condensation by the thawing seal caps with sealant prepared by mixing is prevented as well.

The extrusion rate or filling rate of the sealant, or the filling time, can be adjusted preferably via corresponding adjustments on the device, preferably the robot. The filling rate is preferably adapted to the properties of the sealant, particularly the viscosity, the rheology and/or the stringing. Through such adjustments, the aim is to achieve an optimized filling pattern (height and silhouette of the filling in the seal cap) that meets the requirements of the user, particularly the surface requirements imposed on the filling. In one preferred embodiment, the surface of the sealant filling has a planar or level cross section and does not have an elevation which ends in a point and which is formed, for example, when the speed at which the filling unit lifts from the filling is not matched to the stringing properties of the sealant.

The cure rate of the sealant in the seal cap may also be adapted by selecting a faster sealant, something which is not possible, in contrast, when using deep-frozen seal caps.

According to a first, especially preferred embodiment, the seal caps are plastic caps for the sealing of joining elements in aircraft construction, said caps consisting predominantly of at least one high-performance polymer and having a DIN IEC 60243 breakdown strength of at least 10 kV/mm.

These plastic caps are filled with a sealant which has a high energy absorbency and also with at least one filler selected from the group consisting of hollow filling bodies filled with gas and/or air. The plastic caps and the sealant here are joined cohesively to one another.

Seal caps of this kind function as combined protection against fuel and hydraulic oil, especially that based on tributyl phosphate, and also against lightning strike, and can be produced and applied economically.

The following definitions are to apply here:

Reference presently to "high-performance polymer" is to homopolymers and copolymers which are distinguished by high chemical stability and thermal stability.

The concept of the "plastic caps [ . . . ] consisting predominantly of at least one high-performance polymer"

means that they may also include an amount of less than 50 wt % of other constituents which are not high-performance polymers.

The phrase "the plastic caps and the sealant are joined cohesively to one another" should be understood to mean that the filled-in sealant and the at least one high-performance polymer cannot be parted from one another without destruction or do not part under the conditions which are usual in the operation of an aircraft.

The at least one high-performance polymer of the plastic caps is selected more particularly from the group consisting of polyvinylidene fluoride (PVDF), polysulfone (PSU), polyphenylene sulfone (PPSU), polyetheretherketone (PEEK), polyimide (PI), polyamideimide (PAI), polybenzimidazole (PBI), polyetherimide (PEI), and polyphenylene sulfide (PPS).

The sealant filled into the plastic caps is preferably a sealant based on polysulfide and/or polythioether. With particular preference it is a polysulfide and/or a polythioether in combination with manganese dioxide, an isocyanate compound, an isocyanate prepolymer and/or an epoxide compound as hardener.

The use as fillers of hollow filling bodies filled with gas and/or air has the advantage that the microcellular character of such bodies endows them with an energy-absorbing activity. The hollow filling bodies filled with gas and/or air are preferably microballoons.

With seal caps of this kind, precise filling—of the kind enabled by the present invention—is particularly important, since expelled sealant is not resistant to hydraulic oil.

According to a second especially preferred embodiment, the seal caps are caps produced using nozzles described in EP 2 586 537 A1. These nozzles for the application of sealants have a nozzle tip in bell or cowl form, and a clamping ring of the injection side of an elongated nozzle element. Injection may take place manually or with automated sealant injection machines.

With seal caps of this kind, precise filling—as enabled by the present invention—is likewise particularly important.

The invention claimed is:

1. A method for filling seal caps for sealing connecting elements in aircraft construction, the method comprising:
    filling the seal caps with sealant using an automated process, wherein
        positioning a filling unit and/or positioning the seal caps by means of movement in an XYZ coordinate system as well as filling the seal caps is automated; and
        wherein the seal caps are positioned on a support plate in a positioning pattern that corresponds to a positioning pattern of the connecting elements to be sealed; and
        wherein the seal caps are plastic caps comprising at least one high-performance polymer selected from the group consisting of polyvinylidene fluoride (PVDF), polysulfone (PSU), polyphenylene sulfone (PPSU), polyetheretherketone (PEEK), polyimide (PI), polyamideimide (PAI), polybenzimidazole (PBI), polyetherimide (PEI), and polyphenylene sulfide (PPS), the sealant is a sealant based on polysulfide and/or polythioether and the plastic caps and the sealant are joined cohesively to one another.

2. The method according to claim 1, wherein filling is carried out using a device able to travel in the XYZ coordinate system.

3. The method according to claim 2, wherein the device injects the sealant into the seal caps in a contour dictated by the support plate.

4. The method according to claim 1, wherein, prior to filling, an amount of sealant to be injected for a particular seal cap size is stored in a suitable program of a control unit.

5. The method according to claim 3, wherein a filling rate is adapted to properties of the sealant.

6. The method according to claim 1, wherein the plastic caps consist predominantly of the at least one high-performance polymer and having a DIN IEC 60243 breakdown strength of at least 10 kV/mm and the sealant has high energy absorbency and also comprises at least one filler selected from the group consisting of hollow filling bodies filled with gas and/or air.

7. The method according to claim 6, wherein the hollow filling bodies filled with gas and/or air are microballoons.

8. The method according to claim 2, wherein the device able to travel in the XYZ coordinate system is a robot able to travel in the XYZ coordinate system.

9. A method for filling seal caps for sealing connecting elements in aircraft construction, the method comprising:
    filling the seal caps with sealant using an automated process, wherein
        positioning a filling unit and/or positioning the seal caps by means of movement in an XYZ coordinate system as well as filling the seal caps is automated; and
        wherein the seal caps are positioned on a support plate in a positioning pattern that corresponds to a positioning pattern of the connecting elements to be sealed;
        wherein the seal caps are plastic caps consisting predominately of at least one high-performance polymer and having a DIN IEC 60243 breakdown strength of at least 10 kV/mm, wherein the high performance polymer is selected from the group consisting of polyvinylidene fluoride (PVDF), polysulfone (PSU), polyphenylene sulfone (PPSU), polyetheretherketone (PEEK), polyimide (PI), polyamideimide (PAI), polybenzimidazole (PBI), polyetherimide (PEI), and polyphenylene sulfide (PPS);
        wherein the sealant has high energy absorbency, is a sealant based on polysulfide and/or polythioether and also comprises at least one filler selected from the group consisting of hollow filling bodies filled with gas and/or air; and
    wherein the plastic caps and the sealant are joined cohesively to one another.

* * * * *